United States Patent [19]
Arnold et al.

[11] Patent Number: 5,311,590
[45] Date of Patent: May 10, 1994

[54] PROTOCOL ADAPTATION

[75] Inventors: Wolfgang Arnold, Pforzheim; Rudolf Hoyler, Leonberg, both of Fed. Rep. of Germany

[73] Assignee: Alcatel N.V., Amsterdam, Netherlands

[21] Appl. No.: 846,044

[22] Filed: Mar. 5, 1992

[30] Foreign Application Priority Data

Mar. 11, 1991 [DE] Fed. Rep. of Germany ....... 4107742

[51] Int. Cl.$^5$ .......................................... H04M 11/00
[52] U.S. Cl. ...................................... 379/387; 379/93
[58] Field of Search ..................... 379/93, 387; 375/8; 395/200

[56] References Cited

U.S. PATENT DOCUMENTS

| | | | |
|---|---|---|---|
| 4,891,783 | 1/1990 | Aritaka et al. | |
| 5,012,470 | 4/1991 | Shobu et al. | 370/110.1 |
| 5,193,110 | 3/1993 | Jones et al. | 379/93 X |
| 5,216,704 | 6/1993 | Williams et al. | 379/387 X |

FOREIGN PATENT DOCUMENTS 0195598 9/1986 European Pat. Off. .
3705882 7/1989 Fed. Rep. of Germany .

OTHER PUBLICATIONS

Austin et al., "The Universal Port Concept," ATT Technical Journal, Mar./Apr. 1989.
Hassler, "Multiprotokoll–controller für High-Speed," Design and Elektronik 6 vom, Dec. 3, 1991, pp. 56–58.
IBM Technical Disclosure Bulletin, vol. 28, No. 3, Aug. 1985, pp. 924–925.
IBM Technical Disclosure Bulletin, vol. 26, No. 7A, Dec. 1985, pp. 3483–3484.
Document No.: ETS [CA]; Version: 1; Date: Jul. 19, 1990; "Integrated Services Digital Network (ISDN) . . . .".
Trouvat et al., "ISDN, Initial Results: Lessons for Tomorrow," ISSLS, Sep. 11–16, 1988, pp. 202–207.

Primary Examiner—James L. Dwyer
Assistant Examiner—Creighton Smith
Attorney, Agent, or Firm—Spencer, Frank & Schneider

[57] ABSTRACT

A telecommunications terminal is provided with two protocols. After initialization and activation of one of the protocols, a status inquiry is sent to a digital exchange indicating the activated protocol. The telecommunications terminal is operated according to a received status message indicating the protocol being used by the digital exchange, or if none is received before elapse of a timer, according to the second of the two protocols.

2 Claims, 2 Drawing Sheets

PROTOCOL ADAPTATION

BACKGROUND OF THE INVENTION

1. Field of the Invention

The present invention relates to a method of adapting protocols of a telecommunications terminal to a protocol of a digital exchange.

2. Background Information

Guideline 1TR6 of the German Bundespost describes the transfer of signalling information between an ISDN digital exchange and ISDN telecommunications terminals. Thus, all ISDN terminals will be equipped, in accordance with the protocol 1TR6, to be able to exchange information with a digital exchange operating according to this protocol (cf. ISDN-D-Kanal-Protokoll 1TR6, Ausgabe 1.90, Deutsche Bundespost, FTZ).

In Europe, a committee of the ETSI (European Telecommunications Standards Institute) is currently drawing up an ISDN protocol for Layer 3 functions (cf. Document No. ETS T/S 46-30, Version 1, Jul. 19, 1990, Integrated Services Digital Network (ISDN), User-Network Interface Layer 3 Specification for basic call control, Application of CCITT Recommendations Q.930/I.450 and Q.931/I.451).

If the ETSI protocol is introduced in Europe, i.e., if it is used in all digital exchanges, the old protocols in all ISDN terminals (in the Federal Republic of Germany the aforementioned protocol 1TR6) will have to be replaced by the ETSI protocol.

SUMMARY OF THE INVENTION

The invention has for its object to provide a method which permits such an adaptation to such a new protocol without the need to replace the old protocols in each terminal.

This object is attained by providing both protocols in the terminal and determining the protocol used by the exchange.

Through the method according to an embodiment of the invention, and since each terminal can already operate according to the two ISDN protocols, the respective terminal can be directly adapted, i.e., switched, to the new protocol in an advantageous manner by sending an unambiguous status inquiry to the exchange when protocol conversion takes place there (e.g., from 1TR6 to ETSI).

BRIEF DESCRIPTION OF THE DRAWINGS

Further advantageous features of the subject matter of the invention will become more apparent from the following description of an embodiment taken in conjunction with the accompanying drawings, in which.

DETAILED DESCRIPTION OF THE PREFERRED EMBODIMENTS

It is assumed that a telecommunications terminal to be adapted to a digital exchange VST contains two different protocols, which are stored in EEPROMs, for example. A first protocol is the ISDN D channel protocol 1TR6 of the German Bundespost, and a second protocol is an ISDN Layer 3 protocol of the ETSI, hereinafter referred to as "Europrotocol".

Figure 1:
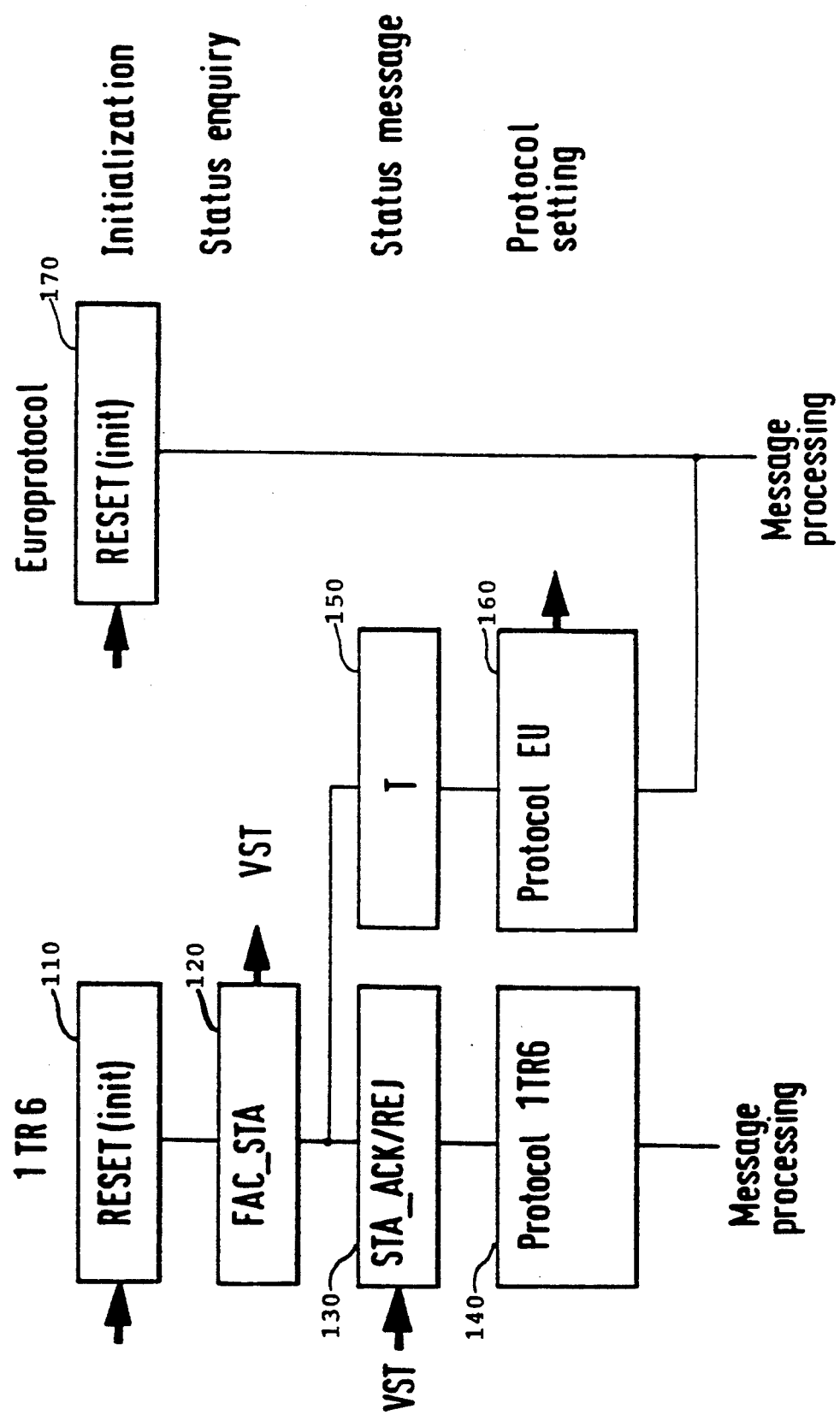
FIG. 1 shows a procedure in accordance with the invention for the protocol 1TR6.

After initialization RESET(init) of the terminal at box 110, the protocol 1TR6 is activated as the first protocol, as shown in FIG. 1. Then, a FAC(ility) STA(-tus) inquiry (box 120) according to protocol 1TR6 is sent to the exchange VST; at the same time, a timer T is started at box 150. The first element of the status inquiry, the protocol discriminator, indicates the protocol being used by the terminal.

In response to the status inquiry, the exchange VST sends to the terminal a STA ACK/REJ message containing the protocol discriminator at box 130. If agreement between the protocols is signalled, STA ACK, the terminal can be operated according to the already activated protocol 1TR6 at box 140 (see FIG. 1).

If a time preset by the timer T is exceeded without a status message being received, the Europrotocol EU will be activated at box 160.

Figure 2:
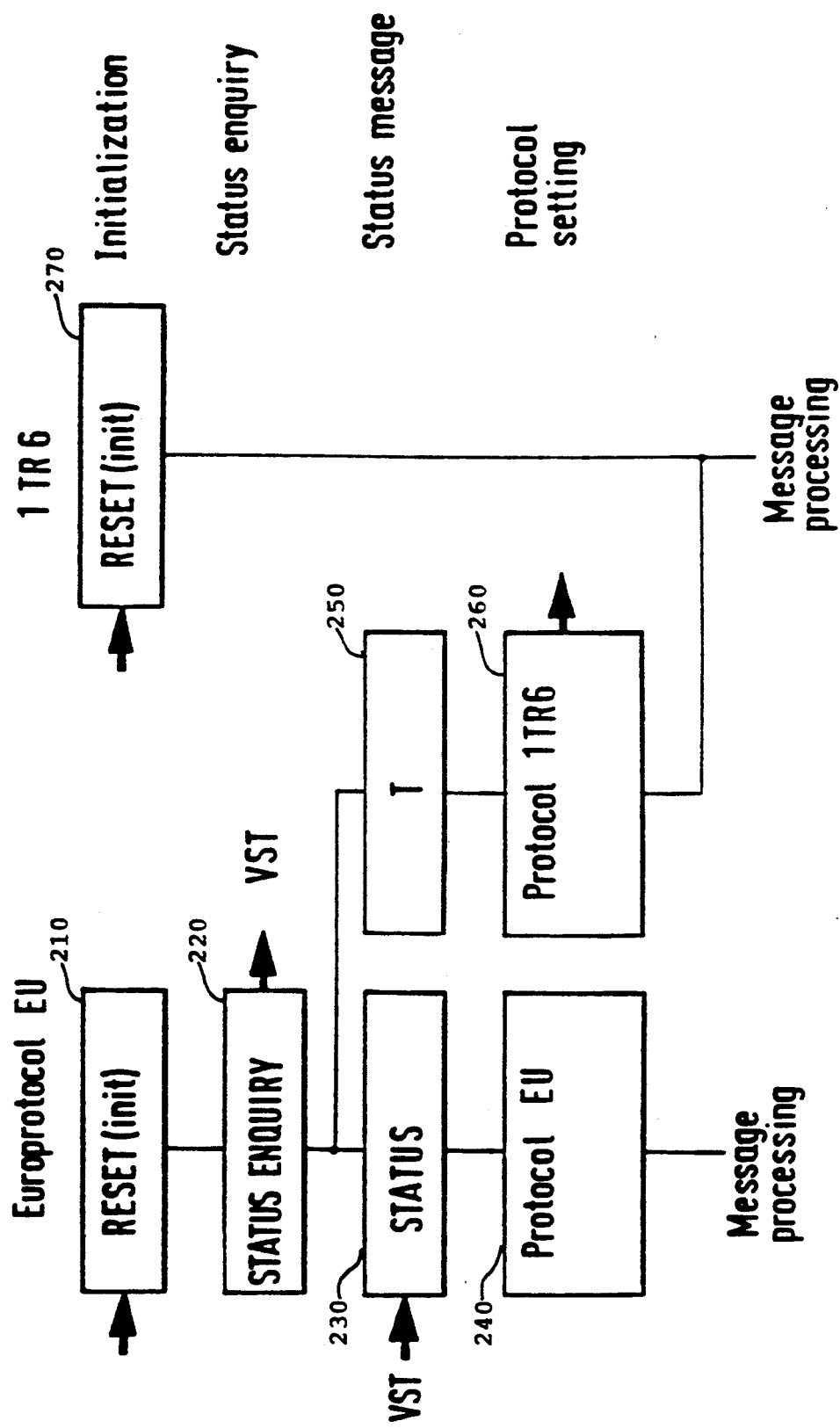
FIG. 2 shows a procedure in accordance with the invention for the ETSI protocol.

Assuming that, after initialization RESET(init) of the terminal (box 210), the Europrotocol EU is activated as the first protocol, as shown in FIG. 2, a STATUS INQUIRY message according to the Europrotocol will be sent to the exchange VST at box 220. Here, too, the first element (the protocol discriminator) of the status inquiry indicates the protocol being used.

In response to the status enquiry, a STATUS message containing the protocol discriminator is provided at box 230. If agreement between the protocols is signalled, the terminal will be operated according to the Europrotocol EU at box 240 (see FIG. 2).

If no status message is received before the expiration of the time preset by the timer T at box 250, the terminal will be switched to protocol 1TR6 at box 260.

Thus, the method according to the invention permits simple, low-cost protocol adaptation without the need for hardware or software modifications in the terminals.

We claim:

1. Method of operating a telecommunications terminal containing two different data communications protocols for controlling data communication with a digital exchange, the digital exchange operating according to a fixed one of the two different protocols, comprising the following steps:

after initializing the telecommunications terminal, activating a first one of the two different data communications protocols;

sending to the digital exchange a status inquiry indicating the activated first one of the two communications protocols, and starting a timer;

operating the telecommunications terminal according to the activated first one of the two communications protocols if a status message is received from the digital exchange signaling agreement between the activated first one of the two protocols and the fixed one of the two different protocols; and activating the other second one of the two communications protocols and operating the telecommunications terminal according thereto if one of: a status message is received from the digital exchange which signals disagreement between the activated first one of the two protocols and the fixed one of the two different protocols, and if the timer has expired without a status message being received;

wherein, in the status inquiry and the status message, a protocol discriminator forms a first information element indicating the protocol being used, the first information element being evaluated at the digital exchange and at the telecommunications terminal, respectively, to determine agreement or disagreement between protocols.

2. A method as claimed in claim 1 wherein the first one of the two protocols is the ISDN D-channel protocol 1TR6 issued January 1990 of the Deutsche Bundespost, and wherein the second one of the two protocols is the ISDN protocol of the European Telecommunications Standards Institute for the User-Network Interface Layer 3 Specification version 1, Jul. 19, 1990 for basic call control.

* * * * *